United States Patent
Bhamri et al.

(10) Patent No.: US 12,531,699 B2
(45) Date of Patent: Jan. 20, 2026

(54) CONTROL SIGNAL CONFIGURATION WAVEFORM TYPE

(71) Applicant: Lenovo (Singapore) Pte. Ltd., New Tech Park (SG)

(72) Inventors: Ankit Bhamri, Rödermark (DE); Ali Ramadan Ali, Kraiburg am Inn (DE); Karthikeyan Ganesan, Kronberg im Taunus (DE); Alexander Johann Maria Golitschek Edler von Elbwart, Darmstadt (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 325 days.

(21) Appl. No.: 18/012,726

(22) PCT Filed: Jun. 26, 2021

(86) PCT No.: PCT/IB2021/055719
§ 371 (c)(1),
(2) Date: Dec. 23, 2022

(87) PCT Pub. No.: WO2021/260659
PCT Pub. Date: Dec. 30, 2021

(65) Prior Publication Data
US 2023/0283436 A1 Sep. 7, 2023

Related U.S. Application Data

(60) Provisional application No. 63/044,454, filed on Jun. 26, 2020.

(51) Int. Cl.
*H04L 5/00* (2006.01)
*H04W 72/232* (2023.01)

(52) U.S. Cl.
CPC .......... *H04L 5/0053* (2013.01); *H04L 5/0092* (2013.01); *H04W 72/232* (2023.01)

(58) Field of Classification Search
CPC . H04L 5/0053; H04L 5/0092; H04L 27/0008; H04L 27/26025; H04L 27/2614; H04W 72/232
See application file for complete search history.

(56) References Cited

U.S. PATENT DOCUMENTS 9,847,897 B1 12/2017 Cheng et al.
10,397,910 B2 * 8/2019 Lei ..................... H04W 72/52
(Continued)

FOREIGN PATENT DOCUMENTS

CN 108886772 A * 11/2018 ............ H04W 72/23
CN 110800343 A * 2/2020 ............. H04L 27/26
(Continued)

OTHER PUBLICATIONS

PCT/IB2021/055719, "Notification of Transmittal of the International Search Report and the Written Opinion of the International Searching Authority, or the Declaration", International Searching Authority, Sep. 24, 2021, pp. 1-14.
(Continued)

*Primary Examiner* — Eric Nowlin
(74) *Attorney, Agent, or Firm* — Kunzler Bean & Adamson

(57) ABSTRACT

Apparatuses, methods, and systems are disclosed for associating a control signaling configuration with a waveform type. One apparatus in a mobile communication network includes a processor and a transceiver that receives a configuration for control signaling. The processor associates a control signaling configuration with a waveform type, where at least two different waveform types are associated with different control signaling configurations. The transceiver
(Continued)

receives from a radio access network a control signal transmission using the associated waveform type.

20 Claims, 8 Drawing Sheets

(56) References Cited

U.S. PATENT DOCUMENTS

| | | | |
|---|---|---|---|
| 10,993,218 B2* | 4/2021 | Lei | H04W 72/541 |
| 11,063,800 B2* | 7/2021 | Akkarakaran | H04L 27/262 |
| 11,082,931 B2* | 8/2021 | Osawa | H04L 27/26 |
| 11,425,702 B2* | 8/2022 | Ryu | H04L 5/0053 |
| 11,451,357 B2* | 9/2022 | Nory | H04W 72/51 |
| 11,457,451 B2* | 9/2022 | Matsumura | H04W 72/21 |
| 11,489,562 B2* | 11/2022 | Bai | H04W 72/23 |
| 11,653,360 B2* | 5/2023 | Lei | H04W 72/23 370/329 |
| 11,743,784 B2* | 8/2023 | Ly | H04W 72/1268 370/331 |
| 11,855,918 B2* | 12/2023 | Ma | H04L 5/0044 |
| 12,048,020 B2* | 7/2024 | Elshafie | H04W 74/0833 |
| 12,095,697 B2* | 9/2024 | Tiirola | H04L 5/0053 |
| 2017/0289972 A1* | 10/2017 | Lei | H04L 5/0094 |
| 2018/0287762 A1* | 10/2018 | Sun | H04L 5/0053 |
| 2018/0287840 A1* | 10/2018 | Akkarakaran | H04L 27/262 |
| 2019/0173701 A1 | 6/2019 | Ma et al. | |
| 2019/0253122 A1* | 8/2019 | Yang | H04B 7/04 |
| 2019/0260498 A1* | 8/2019 | Moroga | H04W 72/20 |
| 2019/0261315 A1 | 8/2019 | Zhang et al. | |
| 2019/0364550 A1* | 11/2019 | Lei | H04L 5/0053 |
| 2019/0380144 A1 | 12/2019 | Luo et al. | |
| 2020/0045676 A1* | 2/2020 | Ryu | H04L 5/001 |
| 2020/0127787 A1* | 4/2020 | Nory | H04W 48/08 |
| 2020/0196252 A1* | 6/2020 | Osawa | H04W 52/365 |
| 2020/0314709 A1* | 10/2020 | Ly | H04W 36/00725 |
| 2020/0389786 A1* | 12/2020 | Yerramalli | H04W 56/0015 |
| 2021/0036743 A1* | 2/2021 | Bai | H04B 17/24 |
| 2021/0136806 A1* | 5/2021 | Xiong | H04W 72/23 |
| 2021/0160111 A1* | 5/2021 | Ma | H04L 27/2628 |
| 2021/0176756 A1* | 6/2021 | Matsumura | H04L 5/0012 |
| 2021/0204263 A1* | 7/2021 | Lei | H04W 72/1273 |
| 2022/0190989 A1* | 6/2022 | Tiirola | H04L 5/0094 |
| 2022/0345261 A1* | 10/2022 | Ali | H04L 27/2636 |
| 2023/0156802 A1* | 5/2023 | Elshafie | H04L 1/1812 370/329 |
| 2023/0224073 A1* | 7/2023 | Xiong | H04B 17/318 370/329 |
| 2024/0089044 A1* | 3/2024 | Ma | H04L 5/0044 |
| 2024/0155641 A1* | 5/2024 | Taherzadeh Boroujeni | H04W 72/232 |

FOREIGN PATENT DOCUMENTS

| | | | | |
|---|---|---|---|---|
| CN | 113826347 A | * | 12/2021 | H04L 5/0051 |
| CN | 113950810 A | * | 1/2022 | H04L 27/0008 |
| CN | 114175532 A | * | 3/2022 | H04B 17/24 |
| CN | 114531957 A | * | 5/2022 | H04L 27/2613 |
| CN | 108886772 B | * | 4/2023 | H04W 74/0816 |
| CN | 110800343 B | * | 5/2023 | H04L 27/26 |
| CN | 118339794 A | * | 7/2024 | H04L 5/0092 |
| CN | 114175532 B | * | 8/2024 | H04B 17/24 |
| CN | 113950810 B | * | 1/2025 | H04L 27/0008 |
| EP | 3737025 B1 | * | 10/2021 | H04L 27/0008 |
| EP | 3412088 B1 | * | 7/2024 | H04W 74/0816 |
| JP | 2024542968 A | * | 11/2024 | H04L 5/0092 |
| KR | 20180131547 A | * | 12/2018 | H04W 72/23 |
| KR | 20220042357 A | * | 4/2022 | |
| KR | 102831451 B1 | * | 7/2025 | H04W 74/085 |
| TW | 202123621 A | * | 6/2021 | H04B 17/24 |
| TW | 1855116 B | * | 9/2024 | |
| WO | WO-2017166270 A1 | * | 10/2017 | H04W 72/23 |
| WO | WO-2018203379 A1 | * | 11/2018 | H04L 27/26 |
| WO | WO-2020033191 A1 | * | 2/2020 | H04L 1/08 |
| WO | WO-2020234687 A1 | * | 11/2020 | H04L 5/0051 |
| WO | WO-2020247477 A1 | * | 12/2020 | H04L 27/0008 |
| WO | WO-2021025867 A1 | * | 2/2021 | H04B 17/24 |
| WO | WO-2021084333 A1 | * | 5/2021 | H04L 27/2613 |
| WO | WO-2021189213 A1 | * | 9/2021 | |
| WO | WO-2023081225 A1 | * | 5/2023 | H04L 5/0007 |
| WO | WO-2025025162 A1 | * | 2/2025 | |

OTHER PUBLICATIONS

Ericsson, "On DL/UL Resource Allocation", 3GPP TSG RAN1 WG1 Meeting NR#3 R1-1716594, Sep. 18-21, 2017, pp. 1-13.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

3GPP, "3rd Generation Partnership Project; Technical Specification Group Radio Access Network; Study on requirements for NR beyond 52.6 GHZ (Release 16)", 3GPP TR 38.807 V16.0.0, Dec. 2019, pp. 1-68.

* cited by examiner

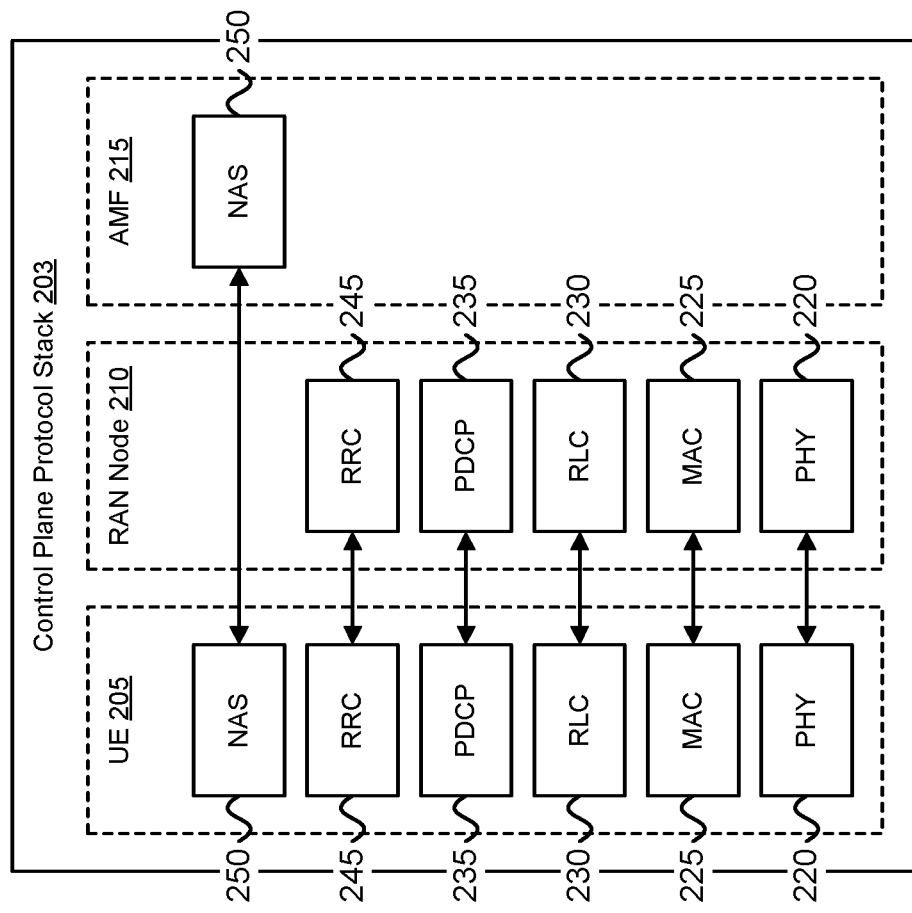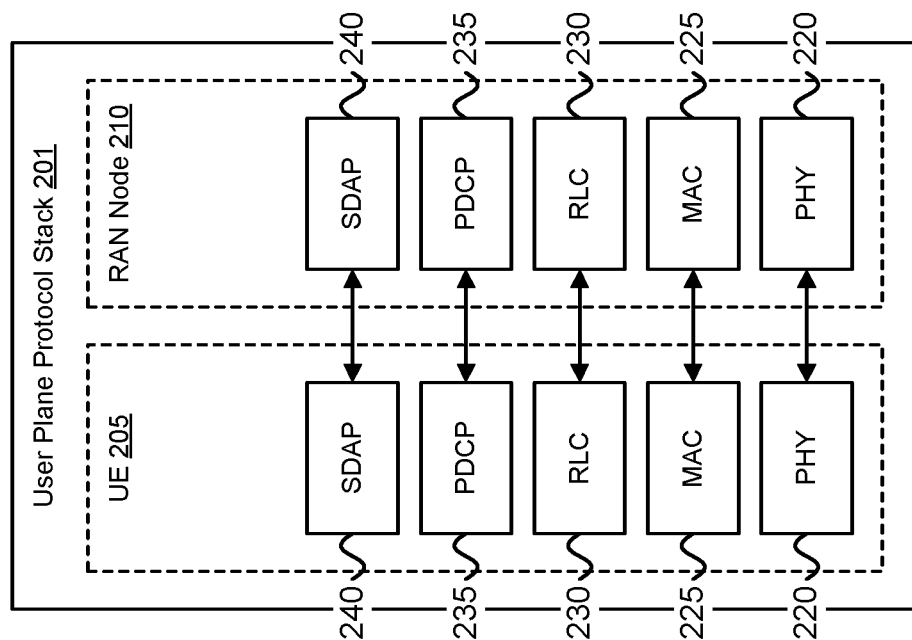
FIG. 2

```
-- ASN1START
-- TAG-CONTROLRESOURCESET-START

ControlResourceSet ::=        SEQUENCE {
    controlResourceSetId          ControlResourceSetId,
    waveformType                  ENUMERATED {CP-OFDM, DFT-s-OFDM, WaveformType3, ...}
    frequencyDomainResources      BIT STRING (SIZE (45)),
    duration                      INTEGER (1..maxCoReSetDuration),
    cce-REG-MappingType           CHOICE {
        interleaved                   SEQUENCE {
            reg-BundleSize                ENUMERATED {n2, n3, n6},
            interleaverSize               ENUMERATED {n2, n3, n6},
            shiftIndex                    INTEGER(0..maxNrofPhysicalResourceBlocks-1)     OPTIONAL  -- Need S
        },
        nonInterleaved                NULL
    },
    precoderGranularity           ENUMERATED {sameAsREG-bundle, allContiguousRBs},
    tci-StatesPDCCH-ToAddList     SEQUENCE(SIZE (1..maxNrofTCI-StatesPDCCH)) OF TCI-StateId  OPTIONAL,  -- Cond NotSIB1-initialBWP
    tci-StatesPDCCH-ToReleaseList SEQUENCE(SIZE (1..maxNrofTCI-StatesPDCCH)) OF TCI-StateId  OPTIONAL,  -- Cond NotSIB1-initialBWP
    tci-PresentInDCI              ENUMERATED {enabled}                                       OPTIONAL,  -- Need S
    pdcch-DMRS-ScramblingID       INTEGER (0..65535)                                         OPTIONAL,  -- Need S
    ...,
    [[
    rb-Offset-r16                     INTEGER (0..5)                                         OPTIONAL,  -- Need N
    tci-PresentInDCI-ForDCI-Format1-2-r16  INTEGER (1..3)                                    OPTIONAL,  -- Need S
    coresetPoolIndex-r16              INTEGER (0..1)                                         OPTIONAL,  -- Need R
    controlResourceSetId-r16          ControlResourceSetId-r16                               OPTIONAL   -- Need S
    ]]
}

-- TAG-CONTROLRESOURCESET-STOP
-- ASN1STOP
```

FIG. 3

CONTROL SIGNAL CONFIGURATION WAVEFORM TYPE

CROSS-REFERENCE TO RELATED APPLICATIONS

This application claims priority to U.S. Provisional Patent Application No. 63/044,454 entitled "APPARATUSES, METHODS, AND SYSTEMS FOR MULTIPLE WAVEFORM INDICATION AND SWITCHING" and filed on Jun. 26, 2020 for Ankit Bhamri, Ali Ramadan Ali, Karthikeyan Ganesan, Alexander Golitschek, and Vijay Nangia, which application is incorporated herein by reference.

FIELD

The subject matter disclosed herein relates generally to wireless communications and more particularly relates to apparatuses, method, and systems for multiple waveform indication and/or switching.

BACKGROUND

In certain wireless communication systems, a radio access network supports NR-based operation on frequencies between 52.6 GHz and 71 GHz. Due to the expected performance degradation at high frequencies, additional design requirements on NR beyond 52.6 GHz have been considered. In addition to the high path loss, RF components of the transmitter and the receiver exhibit nonlinear transfer characteristics which leads to further system degradation.

BRIEF SUMMARY

Disclosed are procedures for associating a control signaling configuration with a waveform type. Said procedures may be implemented by apparatus, systems, methods, or computer program products.

One method of a User Equipment ("UE") includes receiving a configuration for control signaling and associating a control signaling configuration with a waveform type, where at least two different waveform types are associated with different control signaling configurations. The method includes receiving—from a radio access network—a control signal transmission using the associated waveform type.

One method of a Radio Access Network ("RAN") node includes configuring a UE with a set of control signaling configurations and transmitting a control signal transmission using an associated waveform type, where at least two different waveform types are associated with different control signaling configurations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a block diagram illustrating one embodiment of a 5G New Radio ("NR") protocol stack;

FIG. 3 is a diagram illustrating one embodiment of an exemplary RRC configuration to CORESET IE that may be used for multiple waveform indication and/or switching;

DETAILED DESCRIPTION

Figure 1:
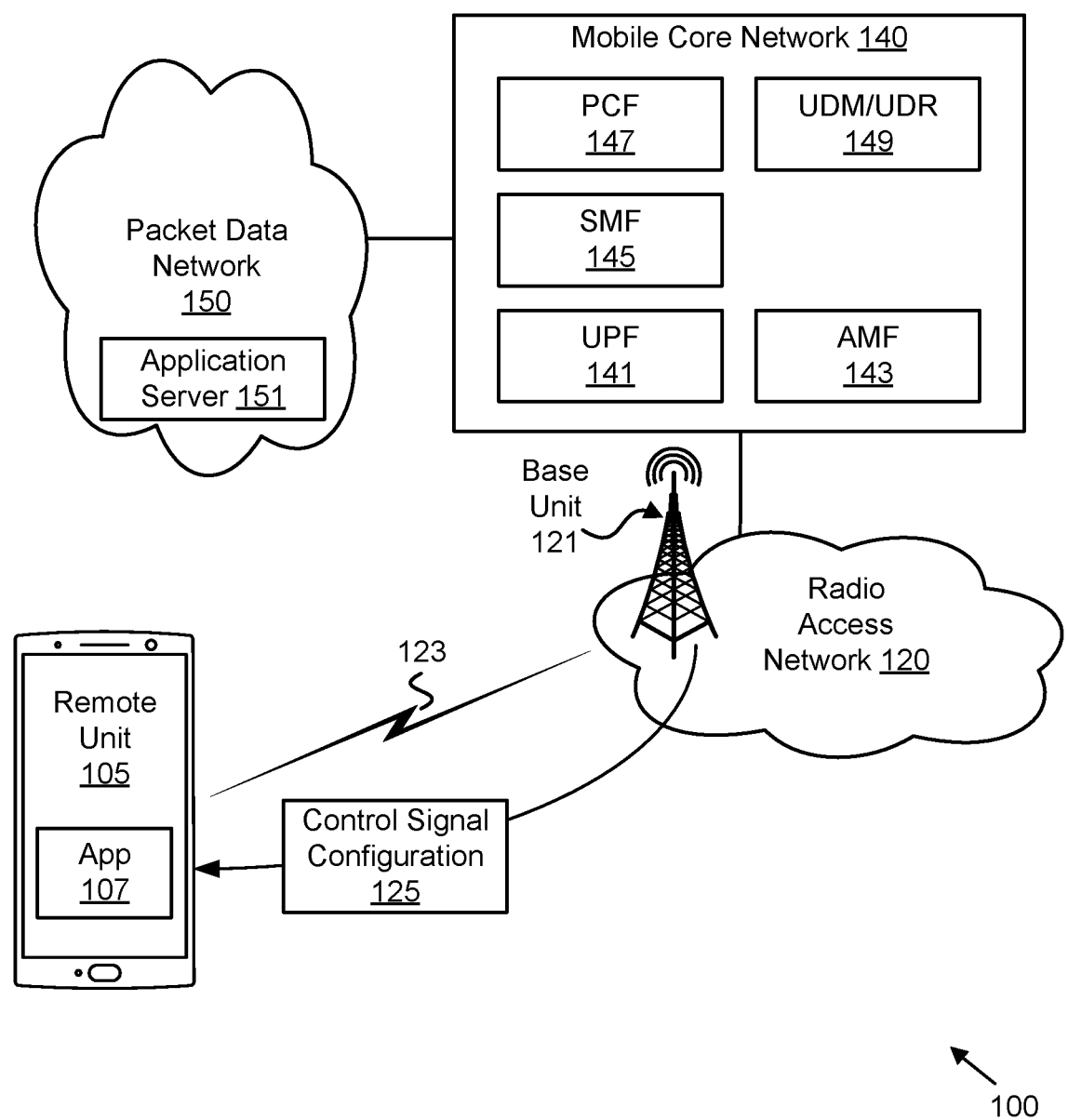
FIG. 1 is a schematic block diagram illustrating one embodiment of a wireless communication system for associating a control signaling configuration with a waveform type.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for associating a control signaling configuration with a waveform type and corresponding scheduled transmissions for downlink and uplink. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Due to the expected performance degradation at high frequencies, additional design requirements on New Radio ("NR") beyond 52.6 GHz have been considered for further investigation. In addition to the high path loss, radio frequency ("RF") components of the transmitter and the receiver exhibit nonlinear transfer characteristics which leads to further system degradation.

In NR Release 15 ("Rel-15"), multi-carrier (e.g., Orthogonal Frequency Division Multiplexing ("OFDM")) based waveform has been adopted for downlink ("DL") as well as for uplink ("UL"). For some cases especially at cell edge, single carrier (e.g., Discrete Fourier Transform ("DFT") Spread OFDM ("DFT-s-OFDM")) is also used in the uplink ("UL") as an option. However, Cyclic Prefix OFDM ("CP-OFDM") performance degrades at high frequencies (e.g., 52.6 GHz and beyond) due to its sensitivity to phase noise and its high Peak-to-Average Power Ratio ("PAPR") or cubic metric ("CM") that limits the cell coverage. The problems of CP-OFDM at high frequencies become severe as the modulation order and/or the channel bandwidth increases. Therefore, some physical layer channels will be affected more than others.

The above-mentioned problems make a single carrier waveform a suitable candidate at high frequencies due to its natural robustness against phase noise and its low PAPR or CM. In NR Rel-15/16, the UL already supports single carrier (DFT-s-OFDM and/or Single Carrier Frequency Division Multiple Access ("SC-FDMA")). However, the power constraint of the UE especially at cell edge necessitates enhancement of the UL as well by adopting other single carrier waveforms such as Single Carrier Quadrature Amplitude Modulation ("SC-QAM") or Single-Carrier Frequency Domain Equalization ("SC-FDE")/Cyclic Prefix Single Carrier ("CP-SC") for cell edge scenarios.

One candidate waveform type for use on high frequencies (e.g., 52.6 GHz and beyond) is OFDM-based single carrier waveform such as DFT-s-OFDM waveform. A single carrier waveform may be used for downlink ("DL") due to its low PAPR comparing with CP-OFDM and its better frequency flexibility comparing with pure single carrier candidates such as SC-QAM. On the other hand, although using DFT-s-OFDM or other single carrier candidates for DL enhances the cell coverage, it limits the Multiple-In-Multiple-Out ("MIMO") capabilities of the system and reduces the flexibility of Demodulation Reference Signal ("DMRS") mapping. Some FR4 expected use cases described in 3GPP TR 38.807 such as high data rate enhanced mobile broadband ("eMBB") require high channel bandwidth for high throughput, where MIMO also can play an important rule.

On the other hand, in factory automation/Industrial Internet-of-Things ("IIoT") applications, the latency, massive access and reliability are the main Key Performance Indicators ("KPIs"). Other use cases such as backhauling, Integrated Access and Backhaul ("IAB") work mostly under Line-of-Sight ("LOS") conditions, where the fading and power consumption is not the major issue. Mobile data offloading requires coexistence with other systems, e.g., 60 GHz Wi-Fi (i.e., "WiGig"). For short-range high-data rate Device-to-Device ("D2D") communications the coverage is limited and PAPR problem is not the main problem to solve. A trade-off between the cell coverage requirements and Quality of Service ("QoS") requirements in terms of latency and throughput needs to be considered to support different deployment and use case scenarios. Therefore, multiple waveform support for downlink ("DL") and uplink ("UL") is a practical solution to accommodate variant deployment, coverage and use case scenarios to enable high system flexibility and optimize the performance a solution for semi-statically switching of the DL waveform for data transmission.

In this disclosure, the issue is addressed of configuring (or indicating or switching) multiple waveforms along with multi-beam (or multiple Transmission and Reception Point ("multi-TRP")) transmission/reception of Physical Downlink Control Channel ("PDCCH") and correspondingly scheduled Physical Downlink Shared Channel ("PDSCH"), Physical Uplink Shared Channel ("PUSCH") and/or Physical Uplink Control Channel ("PUCCH") transmissions and repetitions.

FIG. 1 depicts a wireless communication system 100 for associating a control signaling configuration with a waveform type, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the base unit(s) 121 may provide a cell operating using a first carrier frequency and/or a cell operating using a second frequency. Cells using the first carrier frequency may form a first frequency layer, while cells using the second carrier frequency may form a second frequency layer.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM"") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed. In various embodiments, a first set of set of network slices may be prioritized for use with a first carrier frequency, while a second set of network slices may be prioritized for use with a second carrier frequency. As discussed in greater detail below, the RAN 120 sends one or more control signal configurations 125 to a remote unit 105 (i.e., sent via the base unit 121) so that the remote unit 105 uses a specific waveform type to receive a control signal transmission from the RAN 120.

While FIG. 1 depicts components of a 5G RAN and a 5G core network, the described embodiments for associating a control signaling configuration with a waveform type apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting associating a control signaling configuration with a waveform type.

According to a first solution of the disclosure, multiple waveforms are associated with multiple CORESETs within a slot. According to a second solution of the disclosure, when a UE receives a scheduling grant on PDCCH, there is waveform association between the PDCCH and corresponding scheduled and/or activated transmission. According to a third solution of the disclosure, the UE is configured with a waveform switching pattern of repetitions, retransmissions and/or multiple transmission occasions of a physical channel. According to a fourth solution of the disclosure, multiple waveforms are associated with different BWP indexes.

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

In NR Release 15, multiple waveforms are supported. Specifically, the uplink ("UL") supports both CP-OFDM and DFT-s-OFDM. However, the configuration is only semi-static to select one of these, e.g., by enabling (alternatively, disabling) the parameter 'transformPrecoding.' For example, the RAN node 210 may switch between multicarrier CP-OFDM and single carrier DFT-s-OFDM via RRC configurations. The higher layer parameter transformPrecoder in pusch-Config/configuredGrantConfig or msg3-transformPrecoding in RACH-ConfigCommon provide the indication to enable or disable the transform pre-coder (DFT-s-OFDM) for PUSCH. The UE 205 considers the transform precoding either 'enabled' or 'disabled' based on reading these messages, and the RAN node 210 applies simultaneous receptions of multiple UEs 205 with different waveforms.

Fundamentally, CP-OFDM suffers with the issue of high PAPR, and the issue becomes even more pronounced with higher frequency range. In Rel-17, NR frequency range has been extended from 52.6-71 GHz, however, no change to waveform for DL and UL, only high Subcarrier Spacing ("SCS") adopted to deal with phase noise issue. However, future releases are likely to support new waveform types and even further extension of NR operation, e.g., from 71-114.25 GHz.

Assuming, that support is added for a new waveform while also supporting current (i.e., Rel-15, Rel-16 and Rel-17) waveforms, then the issue of multiple waveform indication/switching/waveform becomes relevant. Depending up on modulation order for different channels, coverage requirements and other potential factors, it might make sense to allow multiplexing/transmission/repetition of control and/or data using multiple waveforms.

For multiple PDCCH transmission/reception for PDSCH scheduling, if the UE 205 is configured by higher layer parameter PDCCH-Config that contains two different values of parameter CORESETPoolIndex in ControlResourceSet Information Element ("IE"), the UE 205 may expect to receive multiple PDCCHs scheduling fully/partially/non-overlapped PDSCHs in time and frequency domain.

The UE may expect the reception of full/partially-overlapped PDSCHs in time only when PDCCHs that schedule two PDSCHs are associated to different CORESETs having different values of CORESETPoolIndex. For a ControlResourceSet without CORESETPoolIndex, the UE may assume that the ControlResourceSet is assigned with CORESETPoolIndex as 0. When the UE is scheduled with full/partially/non-overlapped PDSCHs in time and frequency domain, the full scheduling information for receiving a PDSCH is indicated and carried only by the corresponding PDCCH, the UE is expected to be scheduled with the same active BWP and the same Subcarrier Spacing ("SCS"). When the UE is scheduled with full/partially-overlapped PDSCHs in time and frequency domain, the UE can be scheduled with at most two codewords simultaneously. When PDCCHs that schedule two PDSCHs are associated to different CORESETs having different values of CORESETPoolIndex, the following operations are allowed:

A) For any two Hybrid Automatic Repeat Request ("HARQ") process IDs in a given scheduled cell, if the UE is scheduled to start receiving a first PDSCH starting in symbol j by a PDCCH associated with a value of CORESETpoolIndex ending in symbol i, the UE can be scheduled to receive a PDSCH starting earlier than the end of the first PDSCH with a PDCCH associated with a different value of CORESETpoolIndex that ends later than symbol i.

B) In a given scheduled cell, the UE can receive a first PDSCH in slot i, with the corresponding HARQ Acknowledgement ("HARQ-ACK") assigned to be transmitted in slot j, and a second PDSCH associated with a value of CORESETpoolIndex different from that of the first PDSCH starting later than the first PDSCH with its corresponding HARQ-ACK assigned to be transmitted in a slot before slot j. As used herein, "HARQ-ACK" may represent collectively the Positive Acknowledge ("ACK") and the Negative Acknowledge ("NACK") and Discontinuous Transmission ("DTX"). ACK means that a Transport Block ("TB"), is correctly received while NACK (or NAK) means a TB (i.e., packet) is erroneously received and DTX means that no TB was detected.

If PDCCHs that schedule corresponding PDSCHs are associated to the same or different CORESETs having the same value of CORESETPoolIndex, the UE procedure for receiving the PDSCH upon detection of a PDCCH follows Subclause 5.1.

Basically, the UE can expect to receive multiple PDCCH only when multiple values of CORESETPoolIndex are configured in ControlResourceSet.

When a UE is configured by higher layer parameter RepSchemeEnabler set to one of 'FDMSchemeA,' 'FDMSchemeB,' 'TDMSchemeA,' if the UE is indicated with two Transmission Configuration Indicator ("TCI") states in a codepoint of the DCI field 'Transmission Configuration Indication' and Demodulation Reference Signal ("DM-RS") port(s) within one Code Division Multiplexing ("CDM") group in the DCI field "Antenna Port(s),"

When two TCI states are indicated in a DCI and the UE is set to 'FDMSchemeA,' the UE shall receive a single PDSCH transmission occasion of the TB with each TCI state associated to a non-overlapping frequency domain resource allocation as described in Subclause 5.1.2.3 of 3GPP TS 38.214. Here, "FDM" refers to frequency division multiplexing.

When two TCI states are indicated in a DCI and the UE is set to 'FDMSchemeB,' the UE shall receive two PDSCH transmission occasions of the same TB with each TCI state associated to a PDSCH transmission occasion which has non-overlapping frequency domain resource allocation with respect to the other PDSCH transmission occasion as described in Subclause 5.1.2.3 of 3GPP TS 38.214. Here, "FDM" refers to frequency division multiplexing.

When two TCI states are indicated in a DCI and the UE is set to 'TDMSchemeA,' the UE shall receive two PDSCH transmission occasions of the same TB with each TCI state associated to a PDSCH transmission occasion which has non-overlapping time domain resource allocation with respect to the other PDSCH transmission occasion and both PDSCH transmission occasions shall be received within a given slot as described in Subclause 5.1.2.1 of 3GPP TS 38.214. Here, "TDM" refers to time division multiplexing.

When a UE is configured by the higher layer parameter PDSCH-config that indicates at least one entry in pdsch-TimeDomainAllocationList containing RepNumR16 in PDSCH-TimeDomainResourceAllocation, the UE may expect to be indicated with one or two TCI states in a codepoint of the DCI field 'Transmission Configuration Indication' together with the DCI field "Time domain resource assignment' indicating an entry in pdsch-TimeDomainAllocationList which contain RepNum16 in PDSCH-TimeDomainResourceAllocation and DM-RS port(s) within one CDM group in the DCI field "Antenna Port(s)".

When two TCI states are indicated in a DCI with 'Transmission Configuration Indication' field, the UE may expect to receive multiple slot level PDSCH transmission occasions of the same TB with two TCI states used across multiple PDSCH transmission occasions as defined in Subclause 5.1.2.1 of 3GPP TS 38.214.

When one TCI state is indicated in a DCI with 'Transmission Configuration Indication' field, the UE may expect to receive multiple slot level PDSCH transmission occasions of the same TB with one TCI state used across multiple PDSCH transmission occasions as defined in Subclause 5.1.2.1 of 3GPP TS 38.214.

When a UE is not indicated with a DCI that DCI field "Time domain resource assignment' indicating an entry in pdsch-TimeDomainAllocationList which contain RepNumR16 in PDSCH-TimeDomainResourceAllocation, and it is indicated with two TCI states in a codepoint of the DCI field 'Transmission Configuration Indication' and DM-RS port(s) within two CDM group in the DCI field "Antenna Port(s)", the UE may expect to receive a single PDSCH where the association between the DM-RS ports and the TCI states are as defined in Subclause 5.1.6.2.

When a UE is not indicated with a DCI that DCI field "Time domain resource assignment' indicating an entry in pdsch-TimeDomainAllocationList which contain RepNumR16 in PDSCH-TimeDomainResourceAllocation, and it is indicated with one TCI states in a codepoint of the DCI field 'Transmission Configuration Indication', the UE procedure for receiving the PDSCH upon detection of a PDCCH follows Subclause 5.1.

For multiple PDCCH transmission/reception for PUSCH scheduling, if a UE is configured by higher layer parameter PDCCH-Config that contains two different values of CORESETPoolIndex in ControlResourceSet for the active BWP of a serving cell and PDCCHs that schedule two non-overlapping in time domain PUSCHs are associated to different CORESETs having different values of CORESETPoolIndex, for any two HARQ process IDs in a given scheduled cell, if the UE is scheduled to start a first PUSCH transmission starting in symbol j by a PDCCH associated with a value of CORESETpoolIndex ending in symbol i, the UE can be scheduled to transmit a PUSCH starting earlier than the end of the first PUSCH by a PDCCH associated with a different value of CORESETpoolIndex that ends later than symbol i.

Various solutions have been proposed to enhance the system performance of DL and UL at high frequencies. However, such proposals do not address the problems or provide the benefits of the apparatuses, method, and systems for multiple waveform indication and/or switching, as described in the present disclosure.

For DL having multiple waveforms, the RAN node 210 may select the waveform (possibly including subcarrier spacing) based on some parameters such as the used carrier frequency, UE measurement (Reference Signal Received Power ("RSRP"), Reference Signal Received Quality ("RSRQ"), and/or Signal-to-Interference-Plus-Noise Ratio ("SINR")), UE location, UE 205 and RAN node 210 RF capabilities, UE power status (e.g., Power Headroom ("PH") report), UE assistance information (e.g., DL transform precoding recommendation based on path loss ("PL") estimate), indication of UE battery power status, etc. These factors can affect the dynamic requirements for optimal waveform. For example, the UE battery level can help the RAN node 210 to choose the right waveform, since some waveforms require higher signal processing reception complexity than others, and thus save some UE power at critical battery power status.

According to embodiments of the disclosure, the UE may be configured and/or indicated with a separate waveform to receive for at least one PDCCH CORESET within a slot (or for at least one search space configuration associated with a PDCCH CORESET), where each CORESET can be associated with same or different beams and/or same or different Transmission and Reception Point ("TRPs").

According to embodiments of the disclosure, the UE may associate default waveform for PDSCH and/or PUSCH transmission based on the waveform configured for the CORESET (or search space) carrying the scheduling/activating DCI. The default behavior could be defined based on factors such as used carrier frequency, UE measurement (RSRP/RSRQ/SINR)/location, etc.

According to embodiments of the disclosure, the UE may implicitly/explicitly indicate waveform switching pattern where different waveforms can be used for repetitions/retransmission of PDCCH, PDSCH, PUSCH and/or PUCCH.

One of the key benefits of the proposed solutions is to allow for increased reliability by providing additional degree of diversity to allow waveform switching between different transmissions occasions across same or different beams.

According to embodiments of the first solution, the RAN node 210 (e.g., gNB) may configure each CORESET ID with a waveform type such as CP-OFDM or DFT-s-OFDM or any other multi-carrier or single carrier waveform, where the configuration can be provided by higher layer signaling such as RRC. An example of RRC configuration proposal to CORESET IE is shown in FIG. 3. Notably, the first solution provides a mechanism to associate different CORESET with different waveform types.

FIG. 3 is a diagram illustrating one embodiment of an exemplary RRC configuration of a CORESET IE 300. One method of indicating waveform type for CORESET 300 is simply to introduce a parameter in CORESET RRC config. In the depicted embodiment, CORESET IE 300 includes a parameter 'waveformType' which enumerates the waveform type for the identified CORESET.

In one example implementation of the first solution, if CORESETPoolIndex-r16 is configured to a UE 205 with more than one value, then the UE 205 is not expected to be configured with different waveform types for different CORESET IDs belonging to the same CORESETPoolIndex-r16. Alternatively, a UE 205 can be configured with only a single waveform type for all the PDCCH transmissions (same or different beams) from a single TRP. One criterion here is that CORESETs associated with different TRPs (CORESETPoolIndex) can only have different waveform types. Thus, the UE 205 may be configured with two different CORESETs for two different TRP, where the different CORESETs use different waveforms.

In another example implementation of the first solution, if a UE 205 is configured with the same QCL-TypeD assumption (i.e., the same spatial filter/Rx beam for PDCCH reception at UE) for multiple CORESET IDs, then the UE 205 is not expected to be configured with different waveform types for those multiple CORESET IDs. Alternatively, a UE 205 can be configured with only a single waveform type for all PDCCH transmissions with same QCL-Type D assumption, i.e., same receiver spatial filter (Rx beam) can be used to receive the PDCCHs. One criterion here is that only CORESETs that are associated with different QCL-type D assumption can have different waveform types.

In another example implementation of the first solution, a UE 205 is not expected to be configured with different waveform type for multiple CORESETs, if these multiple CORESETs occupy or overlap in at least some resources within the same time-domain symbol. Alternatively, the UE 205 is not expected to switch waveforms to receive multiple CORESETs within the same time-domain symbol. Another criterion is depending up on how the CORESETs are mapped in time-frequency resources. Basically, should be non-overlapping and ideally on different symbols.

Figure 4A:
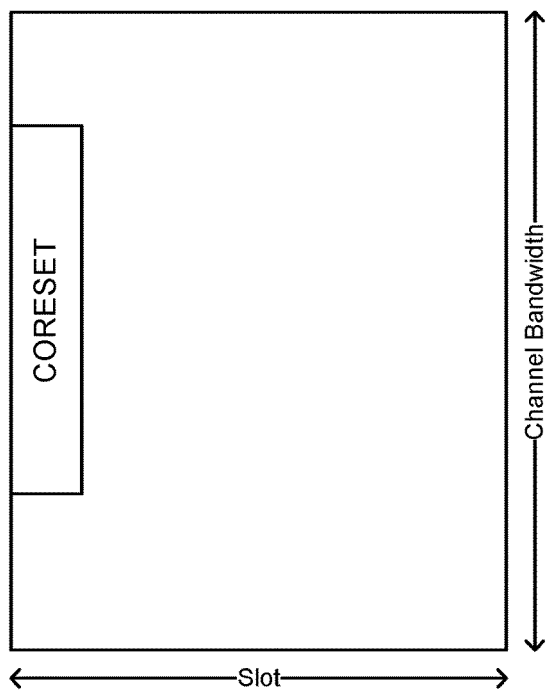
FIG. 4A is a diagram illustrating one embodiment of a Control Resource Set ("CORESET") region.

FIG. 4A depicts a CORESET region 400 within the carrier bandwidth. CORESET is a set of physical resources (i.e., a specific area on NR Downlink Resource Grid) and a set of parameters that is used to carry PDCCH/DCI. In contrast to the LTE PDCCH area (the first 1,2,3,4 OFDM symbols in a subframe) where the control region always spread across the whole channel bandwidth, in NR the CORESET region is localized to a specific region in frequency domain.

In an alternative embodiment of the first solution, the UE 205 is not configured with waveform type indication in the CORESET IE, but as a part of search space configuration, where the waveform type is indicated for each of the DCI formats as part of search space configuration. Search Space is an area within a CORESET that UE should monitor to detect a specific PDCCH/DCI. There are two large categories of Search Space (SS) called CSS (Common Search Space) and USS (UE specific Search Space). Which Search Space UE has to monitor is defined by RNTI type or RRC configuration Another technique to associate CORESET with a waveform type is based on search space configuration, rather than directly indicating in CORESET configuration as mentioned above. In another example, the UE 205 may be configured to receive common search space with a different waveform compared with the user specific search space. This would imply that different waveform types can be indicated to receive different DCI such as one waveform type for DL scheduling DCI and another waveform type for UL scheduling DCI.

In another alternative embodiment of the first solution, if a UE 205 is not configured with any waveform type indication for PDCCH transmission with any of the above described embodiments (and example implementations), then different waveform type can be indicated as part of the initial access procedure signaling. If UE is not configured with any waveform type indication, even as part of the initial access procedure, then UE can assume default waveform type to receive PDCCH depending up on other factors such as subcarrier spacing for PDCCH transmission. In another example, UE is expected to receive rest of the CORESET in an active BWP with the same waveform as that of CORESET 0. In another example, UE is expected to receive all CORESET with the same waveform as that of SSB.

In another embodiment of the first solution, Waveform used for receiving CORESET 0 can be dynamically indicated using a bit in a Physical Broadcast Channel ("PBCH") transmission.

In another embodiment of the first solution, a UE 205 is configured with a first search space configuration associated with a first CORESET and a second search space configuration associated with a second CORESET, the first search space configuration configured with a first waveform type and the second search space configuration configured with a second waveform type, where the first search space and the second search space do not overlap in time-domain (e.g., the first search and the second search space occupy different symbols and/or slots). In one example, the first CORESET and the second CORESET are the same.

In one example, the waveform type indication may comprise a waveform type for DL reception (e.g., PDSCH) and/or a waveform type for UL transmissions (e.g., PUSCH). In another example, a waveform type for DL UE-specific PDSCH reception (e.g., PDSCH associated to PDCCH scrambled by Cell-Radio Network Temporary Identifier ("C-RNTI" in e.g., in UE-specific Search Space ("USS") or common search space ("CSS")) may be different than a waveform type for DL group-common/system information PDSCH (e.g., PDSCH associated to PDCCH scrambled by System Information-Radio Network Temporary Identifier ("SI-RNTI") in CSS). The waveform type for DL group-common/system information PDSCH may be configured, or a default waveform type used for reception of DL group-common/system information PDSCH.

According to embodiments of the second solution, when the UE 205 receives a scheduling DCI on PDCCH CORE- SET (or in a search space) using a specific waveform, then the UE 205 is expected to receive the corresponding scheduled transmission also using the same waveform, unless a separate waveform indication/switching is additionally indicated/configured for receiving such transmissions. Notably, the determination of waveform for data/control channel here is either implicitly determined, e.g., based on the waveform type of scheduling PDCCH, or explicit indication in the DCI.

In one example implementation of the second solution, when the UE 205 is only configured with waveform type on one of the CORESETs (or one of the search spaces) for PDCCH monitoring and receives scheduling/activating DCI for PUSCH transmission, then UE is expected to transmit the corresponding PUSCH using the same waveform type. In another example implementation of the second solution, when the UE 205 is only configured with waveform type on one of the CORESETs (or one of the search spaces) for PDCCH monitoring and receives scheduling/activating DCI for PDSCH reception, then the UE 205 is expected to receive the corresponding PDSCH using the same waveform type.

In an alternative embodiment of the second solution, when the UE 205 is configured with a specific waveform type for PDCCH monitoring on a CORESET (or on a search space) to monitor a scheduling DCI and also the UE 205 is configured with waveform type indication in search space configuration for each of the DCI formats, then the UE 205 is expected to receive the PDCCH using the waveform configured in CORESET (or search space) configuration and in order to receive correspondingly scheduled PUSCH and/or PDSCH, the UE 205 is expected to use the waveform type indicated in the search space configuration for corresponding DCI format.

In one example implementation of the second solution, if there is UE capability limitation in terms of minimum delay to switch waveform types, then the UE 205 is not expected to update waveform with respect to PDCCH unless the minimum delay is satisfied for waveform switching Thus, the UE 205 may consider a minimum timing requirement to switch from one waveform type for PDCCH to a different waveform type for data/control channel. Similarly, UE capability limitation is expected to be followed for waveform switching multiple transmissions and/or repetitions for other channels including PDSCH-PDSCH, PDSCH-PUSCH, PUSCH-PDSCH, PUSCH-PUSCH, etc.

In another alternative embodiment of the second solution, the UE 205 may be indicated with a waveform type in the scheduling DCI in an explicit manner using a dedicated bit field (or a state in a bit field) or implicitly determined depending up on other parameters such as subcarrier spacing value for the scheduled PUSCH and/or PDSCH transmission/reception.

In another embodiment of the second solution, the UE 205 may be configured to determine a waveform type based on the precoding granularity of PRB bundling applied to the reception/transmission of data (e.g., PDSCH or PUSCH) e.g., indicated in the scheduling DCI. For example, a first waveform type (e.g., DFT-s-OFDM) is used for precoding granularity of 'wideband' or same as scheduled bandwidth, and a second waveform type (e.g., CP-OFDM) is used for precoding granularity of 2 or 4 Physical Resource Block ("PRBs"). As used herein, one PRB spans 12 subcarriers, which with 15 kHz SCS corresponds to 180 kHz. In certain embodiments, a PRB mapped over one slot (or subframe) represents the smallest time-frequency resource that can be scheduled to a UE.

According to embodiments of the third solution, when multiple transmissions and/or retransmission and/or repetitions are scheduled/configured/activated for a UE 205, then the UE 205 may be configured/indicated to also switch the waveform types to receive/transmit different occasions of the same physical channel.

In one example implementation of the third solution, when a UE 205 is configured to transmit/receive repetitions from multiple beams/TRPs, then the UE 205 expects to receive/transmit with different waveform types corresponding to different TRPs, where the waveform type associated with TRP can be determined from the waveform type configuration for the given CORESETPoolIndex-r16 in the CORESET IE. Example is illustrated in Table 1 where two TRPs are transmitting 4 PDSCH repetitions associated with 2 different waveform types.

In other example implementations of the third solution, specific patterns for waveform association with transmission occasions (retransmissions/repetitions/actual repetition) from one or multiple TRPs can be explicitly configured semi-statically by high layer signaling such as RRC or dynamically indicated in DCI. The UE 205 uses the waveform type associated with the retransmission number for receiving the PDSCH TB and/or for transmitting the PUSCH TB. The retransmission pattern can be configured such that, the first transmission can be associated with the least robust waveform type and the last retransmission with the most robust waveform type, e.g., 1-CP-OFDM, 2-DFT-s-OFDM, 3-SC-FDE/CP-SC, etc.

In certain embodiments, the configured pattern may also include a change of the waveform numerology for each retransmission, e.g., the retransmission order can be; 1-CP-OFDM with SCS1, 2-CP-OFDM with SCS2, 3-DFT-s-OFDM with SCS1, 4-DFT-s-OFDM with SCS2, etc., where the first transmission uses low SCS value, and the SCS increases for the following retransmissions. In one example, a waveform type and/or subcarrier spacing may be associated with a redundancy version ("RV") to be applied to a transmission occasion. For example, CP-OFDM and/or SCS 1 for RV0 and DFT-s-OFDM and/or SCS 1 for RV3.

In an additional embodiment of the third solution, when a UE 205 is configured to transmit either multiple PUSCH or multiple PDSCH transmissions/repetitions/retransmission using a single scheduling DCI, then the UE 205 is not expected to be indicated with DM-RS antenna ports and number of layers that is only supported for a specific waveform type. For example, the UE 205 is not expected to be configured with rank-8 transmission using 8 DM-RS antenna ports as based on current specification, such DM-RS port indication and high rank support is only specified for CP-OFDM, but not for DFT-s-OFDM. Same principle can be applied to other transmission/reception parameters such that only configurations that can be supported for different waveform types are indicated.

TABLE 1

Example of waveform type association multiple repetitions based on association with TRP

| Repetition Number K | CORESETPoolIndex-r16 (TRP ID) | Waveform Type |
|---|---|---|
| 0 | 0 | CP-OFDM |
| 1 | 1 | DFT-s-OFDM |
| 2 | 0 | CP-OFDM |
| 3 | 1 | DFT-s-OFDM |

According to embodiments of the fourth solution, if multiple BWPs are configured for a UE 205 and BWP switching is allowed, then the waveform switching can be associated with BWP part switching. In one example implementation if a different or higher numerology (subcarrier spacing) is associated for the new BWP, then only waveform switching is done along with BWP switching. In alternate implementation, each BWP is semi-statically configured with a specific waveform type.

In another example implementation, the UE 205 is configured or indicated only with waveform type association for different subcarrier values. Based on such configuration, UE is expected to autonomously switch the waveform types whenever a different numerology is applied either based on BWP switching or any other factors.

Figure 4B:
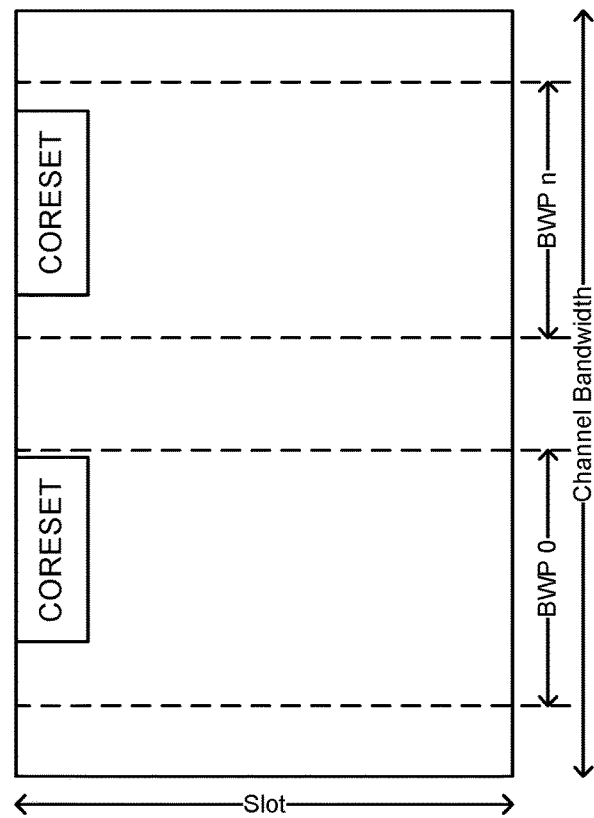
FIG. 4B is a diagram illustrating one embodiment of CORESET regions localized with a Bandwidth Part ("BWP")

FIG. 4B depicts CORESET regions 450 localized with a Bandwidth Part ("BWP") 455. As shown, the carrier bandwidth may be divided into discrete BWPs. In some embodiments, each configured BWP 455 has a localized CORESET region 450.

In various embodiments, the apparatuses, method, and systems for multiple waveform indication and/or switching provide improvements over existing systems, such as for example:
- CORESET-specific and/or DCI format-specific waveform type association as disclosed allows receiving different CORESETs (from one or multiple beams/TRPs) using different waveforms;
- Association in terms of waveform type is provided between the scheduling DCI (or received CORESET) and the scheduled transmissions for PDSCH, PUSCH, or PUCCH;
- Switching of waveform types based on BWP switching is provided where different BWPs are configured with different subcarrier spacing; and
- Waveform switching indication/mechanism is provided for multiple repetitions/retransmissions of any physical channel.

In some embodiments, the terms antenna, panel, and antenna panel are used interchangeably. An antenna panel may be a hardware that is used for transmitting and/or receiving radio signals at frequencies lower than 6 GHz, e.g., frequency range 1 (FR1), or higher than 6 GHz, e.g., frequency range 2 (FR2) or millimeter wave (mmWave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device (e.g., UE, node) antenna panel may be a physical or logical antenna array comprising a set of antenna elements or antenna ports that share a common or a significant portion of an RF chain (e.g., in-phase/quadrature ("I/Q") modulator, analog to digital ("A/D") converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to the RAN node. For certain condition(s), the RAN node 210 can assume the mapping between device's physical antennas to the logical entity "device panel" may not be changed. For example, the condition may include until the next update or report from device or comprise a duration of time over which the RAN node assumes there will be no change to the mapping.

A Device may report its capability with respect to the "device panel" to the RAN node or network. The device capability may include at least the number of "device panels." In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the to channel over which a symbol on the antenna port is conveyed can be inferred from the channel over which another symbol on the same antenna port is conveyed.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Two antenna ports may be quasi-located with respect to a subset of the large-scale properties and different subset of large-scale properties may be indicated by a Quasi-Co- Location ("QCL") Type. For example, the parameter qcl-Type may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}.

Spatial Rx parameters may include one or more of: angle of arrival ("AoA"), Dominant AoA, average AoA, angular spread, Power Angular Spectrum ("PAS") of AoA, average angle of departure ("AoD"), PAS of AoD, transmit/receive channel correlation, transmit/receive beamforming, spatial channel correlation etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter/beam used for reception the reference RS (e.g., DL RS such as SSB/CSI-RS). In another example, the device may transmit the target transmission with the same spatial domain transmission filter/beam used for the transmission of the reference RS (e.g., UL RS such as SRS). A device can receive a configuration of a plurality of spatial relation information configurations for a serving cell for transmissions on the serving cell.

Figure 5:
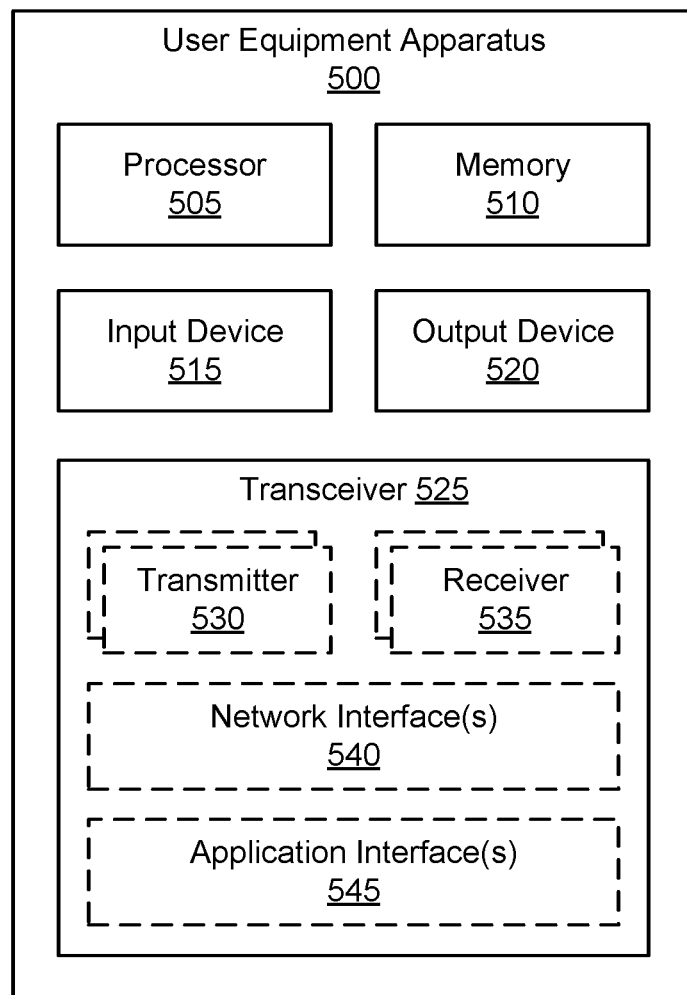
FIG. 5 is a diagram illustrating one embodiment of a user equipment apparatus that may be used for associating a control signaling configuration with a waveform type.

FIG. 5 depicts a user equipment apparatus 500 that may be used for associating a control signaling configuration with a waveform type, according to embodiments of the disclosure. In various embodiments, the user equipment apparatus 500 is used to implement one or more of the solutions described above. The user equipment apparatus 500 may be one embodiment of the remote unit 105 and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panels supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In certain embodiments, the processor 505 may include an application processor (also known as "main processor") which manages application-domain and operating system ("OS") functions and a baseband processor (also known as "baseband radio processor") which manages radio functions.

In various embodiments, via the transceiver 525, the processor 505 receives a configuration for control signaling. The processor 505 associates a control signaling configuration with a waveform type, where at least two different waveform types are associated with different control signaling configurations. The transceiver 525 receives from a radio access network a control signal transmission using the associated waveform type.

In some embodiments, receiving the configuration for control signaling includes receiving a plurality of configurations for multiple Control Resource Sets ("CORESETs"), each configuration associating a configured CORESET with a waveform type, where at least two different waveform types are associated with the multiple configured CORESETs. In certain embodiments, the processor 505 further associates a CORESET configuration and its associated waveform type with a receive beam, a transmit-receive point ("TRP") or some combination thereof. In further embodiments, CORESET transmissions belonging to different TRPs are associated with different waveform types, where PDCCH transmissions from the same TRP are associated with the same waveform type.

In certain embodiments, the processor 505 further receives a Quasi-Co-Location ("QCL") type-D assumption (i.e., receiver spatial filter/beam) for the multiple CORE-SETs. In such embodiments, CORESET identifiers having different QCL Type-D assumptions (i.e., different receiver spatial filters/beams) are associated with different waveform types, while PDCCH transmissions with the same QCL Type-D assumption (i.e., same receiver spatial filter/beam) are associated with the same waveform type. In certain embodiments, CORESET transmissions that overlap in the time domain are associated with the same waveform type.

In some embodiments, receiving the configuration for control signaling includes receiving at least one search space configuration, each search space configuration for monitoring at least one Downlink Control Information ("DCI") format, where different DCI formats are associated with different waveform types. In some embodiments, receiving the control signal transmission includes receiving a scheduling DCI (e.g., on PDCCH CORESET or search space) using a specific waveform type. In such embodiments, the specific waveform type is also used to receive a downlink transmission scheduled by the DCI or to transmit an uplink transmission scheduled by the DCI or activated by the DCI. In certain embodiments, the DCI contains an indication (e.g., flag, parameter, or other explicit indication) that the downlink transmission that is scheduled by the DCI or the uplink transmission that is scheduled/activated by the DCI is to use the same specific waveform type used to receive the DCI.

In some embodiments, receiving the control signal transmission includes receiving a scheduling DCI (e.g., on PDCCH CORESET or search space) containing a waveform type indication. In such embodiments, the indicated waveform type is used to receive a downlink transmission scheduled by the DCI or to transmit an uplink transmission scheduled by the DCI or activated by the DCI. In certain embodiments, the scheduling DCI is received using a first waveform type and the waveform indication indicates a second waveform type. In such embodiments, the UE does not switch waveforms when a delay requirement is not satisfied between a reception time of the scheduling DCI and a scheduled time of the downlink or uplink transmission scheduled by the DCI.

In some embodiments, receiving the control signal transmission includes receiving a scheduling DCI (e.g., on PDCCH CORESET or search space), where a first waveform type is used to receive a downlink transmission scheduled by the DCI or to transmit an uplink transmission scheduled by the DCI, the first waveform type being associated with the precoding granularity size of the precoding resource block group.

In some embodiments, receiving the control signal transmission includes receiving a single scheduling DCI (e.g., on PDCCH CORESET or search space) that schedules multiple transmission occasions. In such embodiments, the processor 505 further switches a waveform type used for different ones of the multiple transmission occasions. In certain embodiments, the multiple transmission occasions are of the same physical channel. In one embodiment, the physical channel is a PDSCH. In another embodiment, the physical channel is a PUSCH.

In certain embodiments, the multiple transmission occasions are for different TRPs, where transmission occasions belonging to different TRPs are associated with different waveform types. In certain embodiments, the processor 505 further receives a waveform switching pattern for retransmissions of a TB during the multiple transmission occasions.

In some embodiments, the processor 505 further receives a configuration for multiple BWPs. In such embodiments, receiving the control signal transmission includes receiving an indication to switch from a current active bandwidth part to a new active bandwidth part, where the processor 505 further switches a waveform type when switching bandwidth parts. In certain embodiments, each bandwidth part is associated with a waveform type. In certain embodiments, a different waveform type is configured for different subcarrier spacing values. In such embodiments, switching bandwidth parts includes switching to a different subcarrier value.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to associating a control signaling configuration with a waveform type. For example, the memory 510 may store various parameters, panel/beam configurations, resource assignments, policies, and the like as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
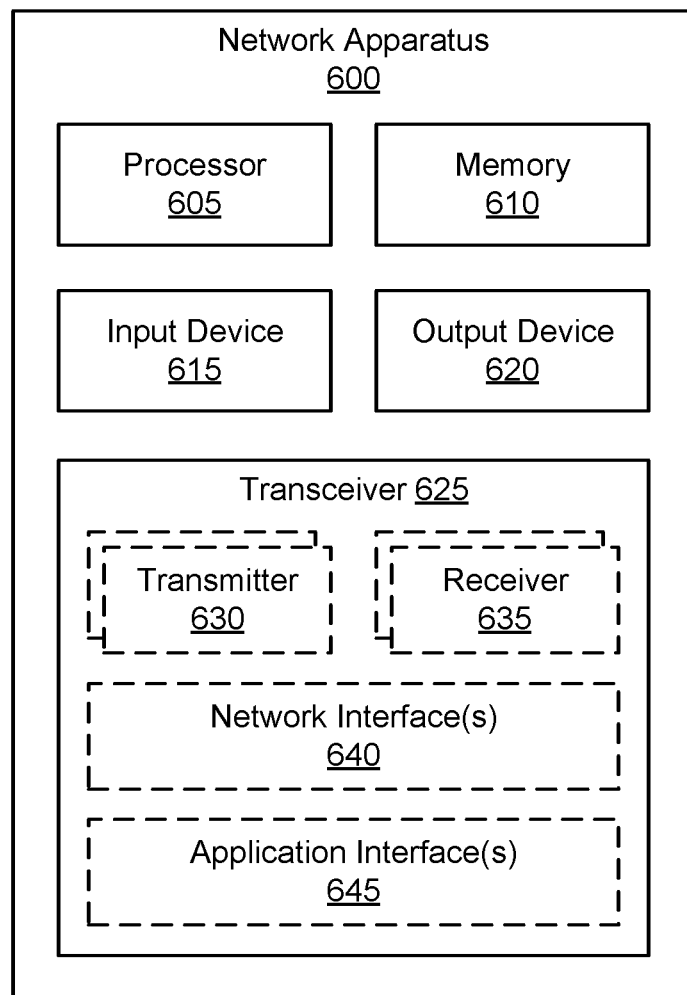
FIG. 6 is a diagram illustrating one embodiment of a network apparatus that may be used for associating a control signaling configuration with a waveform type.

FIG. 6 depicts a network apparatus 600 that may be used for performing associating a control signaling configuration with a waveform type, according to embodiments of the disclosure. In one embodiment, network apparatus 600 may be one implementation of a RAN node, such as the base unit 121 and/or the RAN node 210, as described above. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 65. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network apparatus 600 is a RAN node (e.g., gNB) that communicates with one or more UEs, as described herein. In such embodiments, the processor 605 controls the network apparatus 600 to perform the above described RAN behaviors. When operating as a RAN node, the processor 605 may include an application processor (also known as "main processor") which manages application-domain and operating system ("OS") functions and a baseband processor (also known as "baseband radio processor") which manages radio functions.

In various embodiments, the processor 605 configures a UE with a set of control signaling configurations, wherein at least two different waveform types are associated with different control signaling configurations. The transceiver transmits a control signal transmission using an associated waveform type.

In some embodiments, the set of control signaling configurations includes a plurality of configurations for multiple CORESETs, each configuration associating a configured CORESET with a waveform type, where at least two different waveform types are associated with the multiple configured CORESETs. In certain embodiments, a CORESET configuration further associates a waveform type with a receive beam, a TRP or some combination thereof.

In certain embodiments, CORESET transmissions belonging to different TRPs are associated with different waveform types, wherein PDCCH transmissions from the same TRP are associated with the same waveform type. In certain embodiments, the CORESET transmissions that overlap in the time domain are associated with the same waveform type.

In certain embodiments, the processor further sends a QCL type-D assumption (i.e., receiver spatial filter/beam)

for the multiple CORESETs. In such embodiments, CORESET identifiers having different QCL Type-D assumptions (i.e., different receiver spatial filters/beams) are associated with different waveform types, where PDCCH transmissions with the same QCL Type-D assumption (i.e., same receiver spatial filter/beam) are associated with the same waveform type.

In some embodiments, sending the configuration for control signaling includes sending at least one search space configuration, each search space configuration for monitoring at least one DCI format. In such embodiments, different DCI formats are associated with different waveform types.

In some embodiments, transmitting the control signal transmission includes transmitting a scheduling DCI (e.g., on PDCCH CORESET or search space) using a specific waveform type, where the specific waveform type is also used to transmit a downlink transmission scheduled by the DCI or to receive an uplink transmission scheduled by the DCI or activated by the DCI. In certain embodiments, the DCI contains an indication (e.g., flag, parameter, or other explicit indication) that the downlink transmission that is scheduled by the DCI or the uplink transmission that is scheduled/activated by the DCI is to use the same specific waveform type used to send the DCI.

In some embodiments, transmitting the control signal transmission includes transmitting a scheduling DCI (e.g., on PDCCH CORESET or search space) containing a waveform type indication, where the indicated waveform type is used to transmit a downlink transmission scheduled by the DCI or to receive an uplink transmission scheduled by the DCI or activated by the DCI. In certain embodiments, the scheduling DCI is sent using a first waveform type and the waveform indication indicates a second waveform type. In such embodiments, the UE does not switch waveforms when a delay requirement is not satisfied between a reception time of the scheduling DCI and a scheduled time of the downlink or uplink transmission scheduled by the DCI.

In some embodiments, transmitting the control signal transmission includes transmitting a scheduling DCI (e.g., on PDCCH CORESET or search space), where a first waveform type is used to transmit a downlink transmission scheduled by the DCI or to receive an uplink transmission scheduled by the DCI, the first waveform type being associated with the precoding granularity size of the precoding resource block group.

In some embodiments, transmitting the control signal transmission includes transmitting a single scheduling DCI (e.g., on PDCCH CORESET or search space) that schedules multiple transmission occasions. In such embodiments, the processor further switches a waveform type used for different ones of the multiple transmission occasions. In certain embodiments, the multiple transmission occasions are of the same physical channel. In one embodiment, the physical channel includes a PDSCH. In another embodiment, the physical channel includes a PUSCH.

In certain embodiments, the multiple transmission occasions are for different TRPs, where transmission occasions belonging to different TRPs are associated with different waveform types. In certain embodiments, the processor further sends to the UE a waveform switching pattern for retransmissions of a TB during the multiple transmission occasions.

In some embodiments, the processor further configures the UE for multiple BWPs. In such embodiments, transmitting the control signal transmission includes transmitting an indication to switch from a current active bandwidth part to a new active bandwidth part, where the processor further switches a waveform type when switching bandwidth parts.

In certain embodiments, each bandwidth part is associated with a waveform type. In certain embodiments, a different waveform type is configured for different subcarrier spacing values, where switching bandwidth parts includes switching to a different subcarrier value.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to associating a control signaling configuration with a waveform type. For example, the memory 610 may store parameters, configurations, resource assignments, policies, and the like, as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

Figure 7:
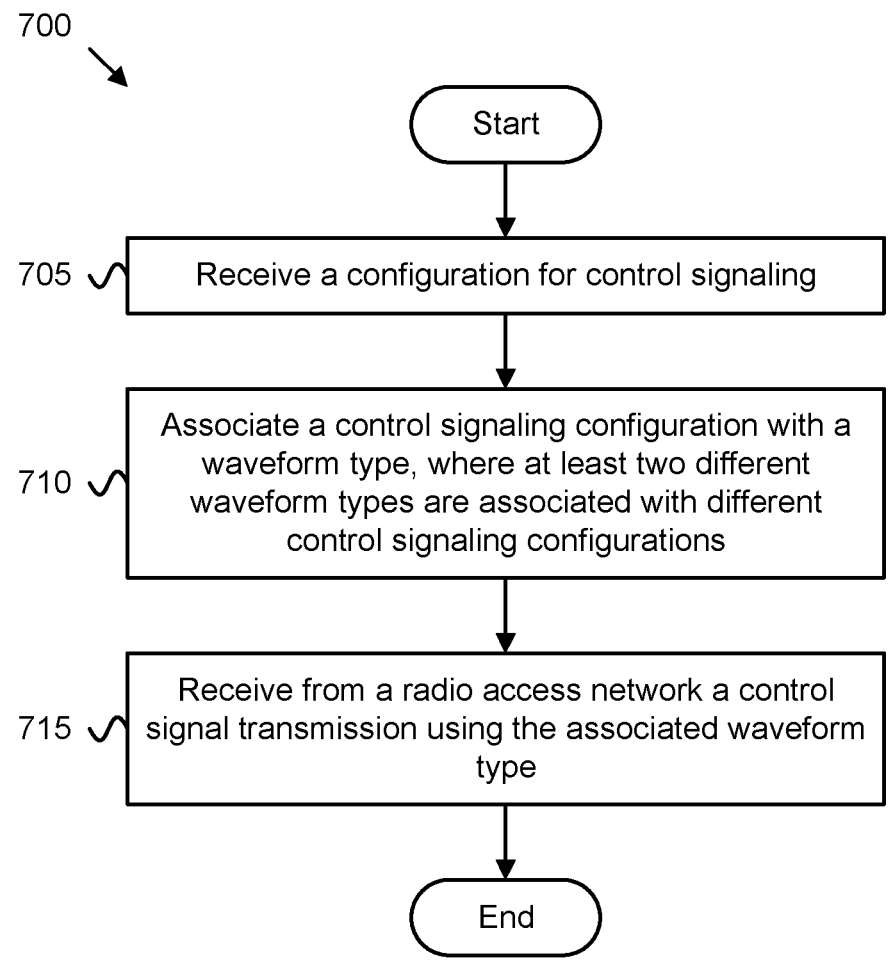
FIG. 7 is a flowchart diagram illustrating one embodiment of a first method for associating a control signaling configuration with a waveform type.

FIG. 7 depicts one embodiment of a method 700 for associating a control signaling configuration with a waveform type, according to embodiments of the disclosure. In various embodiments, the method 700 is performed by a user equipment device in a mobile communication network, such as the remote unit 105, the UE 205, and/or the user equipment apparatus 500, described above. In some embodiments, the method 700 is performed by a processor, such as a microcontroller, a microprocessor, a CPU, a GPU, an auxiliary processing unit, a FPGA, or the like.

The method 700 begins and receives 705 a configuration for control signaling. The method 700 includes associating 710 a control signaling configuration with a waveform type, where at least two different waveform types are associated with different control signaling configurations. The method 700 includes receiving 715 from a radio access network a control signal transmission using the associated waveform type. The method 700 ends.

Figure 8:
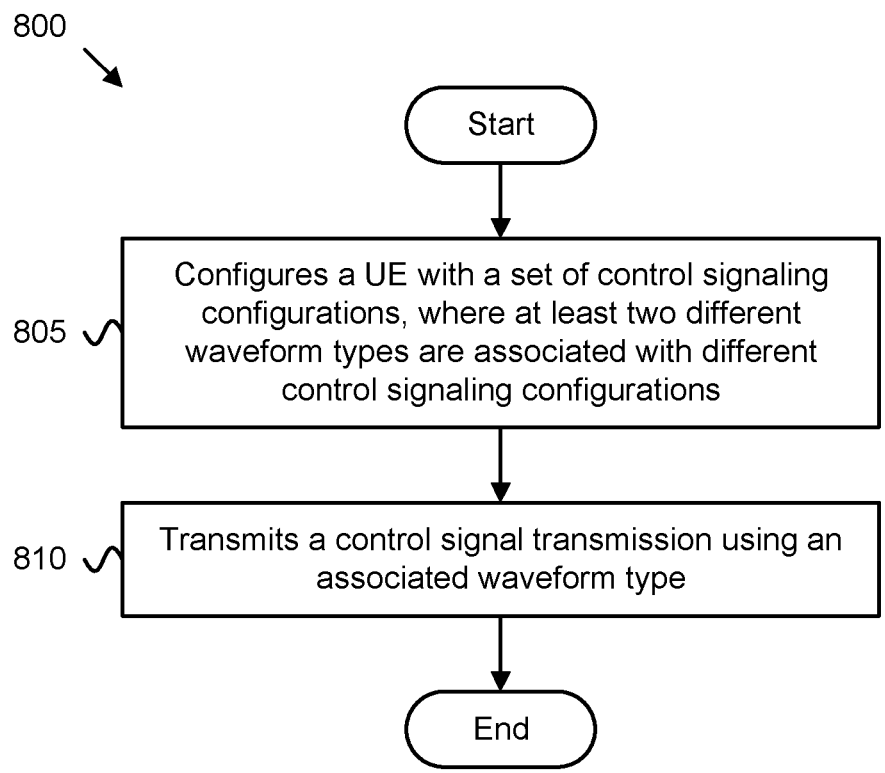
FIG. 8 is a flowchart diagram illustrating one embodiment of a second method for associating a control signaling configuration with a waveform type.

FIG. 8 depicts one embodiment of a method 800 for associating a control signaling configuration with a waveform type, according to embodiments of the disclosure. In various embodiments, the method 800 is performed by a RAN device in a mobile communication network, such as the base unit 121, the RAN node 210, and/or the network equipment apparatus 600, described above. In some embodiments, the method 800 is performed by a processor, such as a microcontroller, a microprocessor, a CPU, a GPU, an auxiliary processing unit, a FPGA, or the like.

The method 800 begins and configures 805 a UE with a set of control signaling configurations, where at least two different waveform types are associated with different control signaling configurations. The method 800 includes transmitting a control signal transmission using an associated waveform type. The method 800 ends.

Disclosed herein is a first apparatus for associating a control signaling configuration with a waveform type, according to embodiments of the disclosure. The first apparatus may be implemented by a user equipment device in a mobile communication network, such as the remote unit 105, the UE 205, and/or the user equipment apparatus 500, described above. The first apparatus includes a transceiver and a processor that receives a configuration for control signaling. The processor associates a control signaling configuration with a waveform type, where at least two different waveform types are associated with different control signaling configurations. The transceiver receives from a radio access network a control signal transmission using the associated waveform type.

In some embodiments, receiving the configuration for control signaling includes receiving a plurality of configurations for multiple CORESETs, each configuration associating a configured CORESET with a waveform type, where at least two different waveform types are associated with the multiple configured CORESETs. In certain embodiments, the processor further associates a CORESET configuration and its associated waveform type with a receive beam, a TRP or some combination thereof. In further embodiments, CORESET transmissions belonging to different TRPs are associated with different waveform types, where PDCCH transmissions from the same TRP are associated with the same waveform type.

In certain embodiments, the processor further receives a QCL type-D assumption (i.e., receiver spatial filter/beam) for the multiple CORESETs. In such embodiments, CORESET identifiers having different QCL Type-D assumptions (i.e., different receiver spatial filters/beams) are associated with different waveform types, while PDCCH transmissions with the same QCL Type-D assumption (i.e., same receiver spatial filter/beam) are associated with the same waveform type. In certain embodiments, CORESET transmissions that overlap in the time domain are associated with the same waveform type.

In some embodiments, receiving the configuration for control signaling includes receiving at least one search space configuration, each search space configuration for monitoring at least one DCI format, where different DCI formats are associated with different waveform types. In some embodiments, receiving the control signal transmission includes receiving a scheduling DCI (e.g., on PDCCH CORESET or search space) using a specific waveform type. In such embodiments, the specific waveform type is also used to receive a downlink transmission scheduled by the DCI or to transmit an uplink transmission scheduled by the DCI or activated by the DCI. In certain embodiments, the DCI contains an indication (e.g., flag, parameter, or other explicit indication) that the downlink transmission that is scheduled by the DCI or the uplink transmission that is scheduled (or activated) by the DCI is to use the same specific waveform type used to receive the DCI.

In some embodiments, receiving the control signal transmission includes receiving a scheduling DCI (e.g., on PDCCH CORESET or search space) containing a waveform type indication. In such embodiments, the indicated waveform type is used to receive a downlink transmission scheduled by the DCI or to transmit an uplink transmission scheduled by the DCI or activated by the DCI. In certain embodiments, the scheduling DCI is received using a first waveform type and the waveform indication indicates a second waveform type. In such embodiments, the UE does not switch waveforms when a delay requirement is not satisfied between a reception time of the scheduling DCI and a scheduled time of the downlink or uplink transmission scheduled by the DCI.

In some embodiments, receiving the control signal transmission includes receiving a scheduling DCI (e.g., on PDCCH CORESET or search space), where a first waveform type is used to receive a downlink transmission scheduled by the DCI or to transmit an uplink transmission scheduled by the DCI, the first waveform type being associated with the precoding granularity size of the precoding resource block group.

In some embodiments, receiving the control signal transmission includes receiving a single scheduling DCI (e.g., on PDCCH CORESET or search space) that schedules multiple transmission occasions. In such embodiments, the processor further switches a waveform type used for different ones of the multiple transmission occasions. In certain embodiments, the multiple transmission occasions are of the same physical channel. In one embodiment, the physical channel is a PDSCH. In another embodiment, the physical channel is a PUSCH.

In certain embodiments, the multiple transmission occasions are for different TRPs, where transmission occasions belonging to different TRPs are associated with different waveform types. In certain embodiments, the processor further receives a waveform switching pattern for retransmissions of a TB during the multiple transmission occasions.

In some embodiments, the processor further receives a configuration for multiple BWPs. In such embodiments, receiving the control signal transmission includes receiving an indication to switch from a current active bandwidth part to a new active bandwidth part, where the processor further switches a waveform type when switching bandwidth parts. In certain embodiments, each bandwidth part is associated with a waveform type. In certain embodiments, a different waveform type is configured for different subcarrier spacing values. In such embodiments, switching bandwidth parts includes switching to a different subcarrier value.

Disclosed herein is a first method for associating a control signaling configuration with a waveform type, according to embodiments of the disclosure. The first method may be performed by a user equipment device in a mobile communication network, such as the remote unit 105, the UE 205, and/or the user equipment apparatus 500, described above. The first method includes receiving a configuration for control signaling and associating a control signaling configuration with a waveform type, where at least two different waveform types are associated with different control signaling configurations. The first method includes receiving from a radio access network a control signal transmission using the associated waveform type.

In some embodiments, receiving the configuration for control signaling includes receiving a plurality of configurations for multiple CORESETs, each configuration associating a configured CORESET with a waveform type. In such embodiments, at least two different waveform types are associated with the multiple configured CORESETs. In certain embodiments, the method further includes associating a CORESET configuration and its associated waveform type with a receive beam, a TRP or some combination thereof.

In certain embodiments, the CORESET transmissions belonging to different TRPs are associated with different waveform types, where PDCCH transmissions from the same TRP are associated with the same waveform type. In certain embodiments, CORESET transmissions that overlap in the time domain are associated with the same waveform type.

In certain embodiments, the first method further including receiving a QCL type-D assumption (i.e., receiver spatial filter/beam) for the multiple CORESETs, wherein CORESET identifiers having different QCL Type-D assumptions (i.e., different receiver spatial filters/beams) are associated with different waveform types, wherein PDCCH transmissions with the same QCL Type-D assumption (i.e., same receiver spatial filter/beam) are associated with the same waveform type.

In some embodiments, receiving the configuration for control signaling includes receiving at least one search space configuration, each search space configuration for monitoring at least one DCI format. Here, different DCI formats are associated with different waveform types.

In some embodiments, receiving the control signal transmission includes receiving a scheduling DCI (e.g., on PDCCH CORESET or search space) using a specific waveform type, wherein the specific waveform type is also used to receive a downlink transmission scheduled by the DCI or to transmit an uplink transmission scheduled by the DCI or activated by the DCI. In II) certain embodiments, the DCI contains an indication (e.g., flag, parameter, or other explicit indication) that the downlink transmission that is scheduled by the DCI or the uplink transmission that is scheduled (or activated) by the DCI is to use the same specific waveform type used to receive the DCI.

In some embodiments, receiving the control signal transmission includes receiving a scheduling DCI (e.g., on PDCCH CORESET or search space) containing a waveform type indication, where the indicated waveform type is used to receive a downlink transmission scheduled by the DCI or to transmit an uplink transmission scheduled by the DCI or activated by the DCI. In certain embodiments, the scheduling DCI is received using a first waveform type and the waveform indication indicates a second waveform type. In such embodiments, the UE does not switch waveforms when a delay requirement is not satisfied between a reception time of the scheduling DCI and a scheduled time of the downlink or uplink transmission scheduled by the DCI.

In some embodiments, receiving the control signal transmission includes receiving a scheduling DCI (e.g., on PDCCH CORESET or search space), where a first waveform type is used to receive a downlink transmission scheduled by the DCI or to transmit an uplink transmission scheduled by the DCI. In certain embodiments, the first waveform type is associated with the precoding granularity size of the precoding resource block group.

In some embodiments, receiving the control signal transmission includes receiving a single scheduling DCI (e.g., on PDCCH CORESET or search space) that schedules multiple transmission occasions. In such embodiments, the first method may include switching a waveform type used for different ones of the multiple transmission occasions. In certain embodiments, the multiple transmission occasions are of the same physical channel. In one embodiment, the physical channel includes a PDSCH. In another embodiment, the physical channel includes a PUSCH.

In certain embodiments, the multiple transmission occasions are for different TRPs, where transmission occasions belonging to different TRPs are associated with different waveform types. In certain embodiments, the first method includes receiving a waveform switching pattern for retransmissions of a TB during the multiple transmission occasions.

In some embodiments, the first method includes receiving a configuration for multiple BWPs. In such embodiments, receiving the control signal transmission includes receiving an indication to switch from a current active bandwidth part to a new active bandwidth part, where the first method further includes switching a waveform type when switching bandwidth parts.

In certain embodiments, each bandwidth part is associated with a waveform type. In certain embodiments, a different waveform type is configured for different subcarrier spacing values, where switching bandwidth parts includes switching to a different subcarrier value.

Disclosed herein is a second apparatus for associating a control signaling configuration with a waveform type, according to embodiments of the disclosure. The second apparatus may be implemented by a RAN device in a mobile communication network, such as the base unit 121, the RAN node 210, and/or the network equipment apparatus 600, described above. The second apparatus includes a transceiver and a processor that configures a UE with a set of control signaling configurations, wherein at least two different waveform types are associated with different control signaling configurations. The transceiver transmits a control signal transmission using an associated waveform type.

In some embodiments, the set of control signaling configurations includes a plurality of configurations for multiple CORESETs, each configuration associating a configured CORESET with a waveform type, where at least two different waveform types are associated with the multiple configured CORESETs. In certain embodiments, a CORESET configuration further associates a waveform type with a receive beam, a TRP or some combination thereof.

In certain embodiments, CORESET transmissions belonging to different TRPs are associated with different waveform types, wherein PDCCH transmissions from the same TRP are associated with the same waveform type. In certain embodiments, the CORESET transmissions that overlap in the time domain are associated with the same waveform type.

In certain embodiments, the processor further sends a QCL type-D assumption (i.e., receiver spatial filter/beam) for the multiple CORESETs. In such embodiments, CORESET identifiers having different QCL Type-D assumptions (i.e., different receiver spatial filters/beams) are associated with different waveform types, where PDCCH transmissions with the same QCL Type-D assumption (i.e., same receiver spatial filter/beams) are associated with the same waveform type.

In some embodiments, sending the configuration for control signaling includes sending at least one search space configuration, each search space configuration for monitoring at least one DCI format. In such embodiments, different DCI formats are associated with different waveform types.

In some embodiments, transmitting the control signal transmission includes transmitting a scheduling DCI (e.g., on PDCCH CORESET or search space) using a specific waveform type, where the specific waveform type is also used to transmit a downlink transmission scheduled by the DCI or to receive an uplink transmission scheduled by the DCI or activated by the DCI. In certain embodiments, the DCI contains an indication (e.g., flag, parameter, or other explicit indication) that the downlink transmission that is scheduled by the DCI or the uplink transmission that is scheduled (or activated) by the DCI is to use the same specific waveform type used to send the DCI.

In some embodiments, transmitting the control signal transmission includes transmitting a scheduling DCI (e.g., on PDCCH CORESET or search space) containing a waveform type indication, where the indicated waveform type is used to transmit a downlink transmission scheduled by the DCI or to receive an uplink transmission scheduled by the DCI or activated by the DCI. In certain embodiments, the scheduling DCI is sent using a first waveform type and the waveform indication indicates a second waveform type. In such embodiments, the UE does not switch waveforms when a delay requirement is not satisfied between a reception time of the scheduling DCI and a scheduled time of the downlink or uplink transmission scheduled by the DCI.

In some embodiments, transmitting the control signal transmission includes transmitting a scheduling DCI (e.g., on PDCCH CORESET or search space), where a first waveform type is used to transmit a downlink transmission scheduled by the DCI or to receive an uplink transmission scheduled by the DCI, the first waveform type being associated with the precoding granularity size of the precoding resource block group.

In some embodiments, transmitting the control signal transmission includes transmitting a single scheduling DCI (e.g., on PDCCH CORESET or search space) that schedules multiple transmission occasions. In such embodiments, the processor further switches a waveform type used for different ones of the multiple transmission occasions. In certain embodiments, the multiple transmission occasions are of the same physical channel. In one embodiment, the physical channel includes a PDSCH. In another embodiment, the physical channel includes a PUSCH.

In certain embodiments, the multiple transmission occasions are for different TRPs, where transmission occasions belonging to different TRPs are associated with different waveform types. In certain embodiments, the processor further sends to the UE a waveform switching pattern for retransmissions of a TB during the multiple transmission occasions.

In some embodiments, the processor further configures the UE for multiple BWPs. In such embodiments, transmitting the control signal transmission includes transmitting an indication to switch from a current active bandwidth part to a new active bandwidth part, where the processor further switches a waveform type when switching bandwidth parts.

In certain embodiments, each bandwidth part is associated with a waveform type. In certain embodiments, a different waveform type is configured for different subcarrier spacing values, where switching bandwidth parts includes switching to a different subcarrier value.

Disclosed herein is a second method for associating a control signaling configuration with a waveform type, according to embodiments of the disclosure. The second method may be performed by a RAN device in a mobile communication network, such as the base unit 121, the RAN node 210, and/or the network equipment apparatus 600, described above. The second method includes configuring a UE with a set of control signaling configurations and transmitting a control signal transmission using an associated waveform type, where at least two different waveform types are associated with different control signaling configurations.

In some embodiments, the configuration for control signaling includes a plurality of configurations for multiple CORESETs, each configuration associating a configured CORESET with a waveform type, where at least two different waveform types are associated with the multiple configured CORESETs. In certain embodiments, a CORESET configuration further associates a waveform type with a receive beam, a TRP or some combination thereof. In certain embodiments, the CORESET transmissions belonging to different TRPs are associated with different waveform types, where PDCCH transmissions from the same TRP are associated with the same waveform type.

In certain embodiments, the second method includes sending a QCL type-D assumption (i.e., receiver spatial filter/beam) for the multiple CORESETs. In such embodiments, CORESET identifiers having different QCL Type-D assumptions (i.e., different receiver spatial filters/beams) are associated with different waveform types, where PDCCH transmissions with the same QCL Type-D assumption (i.e., same receiver spatial filter/beam) are associated with the same waveform type. In certain embodiments, CORESET transmissions that overlap in the time domain are associated with the same waveform type.

In some embodiments, sending the configuration for control signaling includes sending at least one search space configuration, each search space configuration for monitoring at least one DCI format, where different DCI formats are associated with different waveform types.

In some embodiments, transmitting the control signal transmission includes transmitting a scheduling DCI (e.g., on PDCCH CORESET or search space) using a specific waveform type, where the specific waveform type is also used to transmit a downlink transmission scheduled by the DCI or to receive an uplink transmission scheduled by the DCI or activated by the DCI. In certain embodiments, the DCI contains an indication (e.g., flag, parameter, or other explicit indication) that the downlink transmission that is scheduled by the DCI or the uplink transmission that is scheduled (or activated) by the DCI is to use the same specific waveform type used to send the DCI.

In some embodiments, transmitting the control signal transmission includes transmitting a scheduling DCI (e.g., on PDCCH CORESET or search space) containing a waveform type indication, where the indicated waveform type is used to transmit a downlink transmission scheduled by the DCI or to receive an uplink transmission scheduled by the DCI or activated by the DCI. In certain embodiments, the scheduling DCI is sent using a first waveform type and the waveform indication indicates a second waveform type, where the UE does not switch waveforms when a delay requirement is not satisfied between a reception time of the scheduling DCI and a scheduled time of the downlink or uplink transmission scheduled by the DCI.

In some embodiments, transmitting the control signal transmission includes transmitting a scheduling DCI (e.g., on PDCCH CORESET or search space), where a first waveform type is used to transmit a downlink transmission scheduled by the DCI or to receive an uplink transmission scheduled by the DCI, the first waveform type being associated with the precoding granularity size of the precoding resource block group.

In some embodiments, transmitting the control signal transmission includes transmitting a single scheduling DCI (e.g., on PDCCH CORESET or search space) that schedules multiple transmission occasions. In such embodiments, the second method further includes switching a waveform type used for different ones of the multiple transmission occasions. In certain embodiments, the multiple transmission occasions are of the same physical channel. In one embodiment, the physical channel includes a PDSCH. In another embodiment, the physical channel includes a PUSCH.

In certain embodiments, the multiple transmission occasions are for different TRPs, where transmission occasions belonging to different TRPs are associated with different waveform types. In certain embodiments, the second method includes sending a waveform switching pattern for retransmissions of a TB during the multiple transmission occasions.

In some embodiments, the second method includes sending a configuration for multiple BWPs. In such embodiments, transmitting the control signal transmission includes transmitting an indication to switch from a current active bandwidth part to anew active bandwidth part. In such embodiments, the second method further includes switching a waveform type when switching bandwidth parts.

In certain embodiments, each bandwidth part is associated with a waveform type. In certain embodiments, a different waveform type is configured for different subcarrier spacing values, where switching bandwidth parts includes switching to a different subcarrier value.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A User Equipment ("UE") for wireless communication comprising:
a memory; and
a processor coupled to the memory, the processor configured to cause the UE to:
receive a configuration for control channel signaling;
determine a waveform type for a respective control channel signal transmission based on the configuration, wherein at least two different waveform types are associated with different transmissions in a same slot;
receive, from a radio access network ("RAN"), the respective control channel signal transmission using the determined waveform type; and
determine, based on the determined waveform type and the received configuration, a corresponding waveform type for a shared channel signal scheduled by the control channel signal transmission.

2. The UE of claim 1, wherein, to receive the configuration for control channel signaling, the processor is configured to cause the UE to receive a plurality of configurations for multiple Control Resource Sets ("CORESETs"), each configuration associating a configured CORESET with a waveform type, wherein the at least two different waveform types are associated with the multiple CORESETs.

3. The UE of claim 2, wherein the processor is configured to cause the UE to associate a CORESET configuration and the waveform type corresponding to the configured CORESET with a receive beam, a transmit-receive point ("TRP"), or a combination thereof.

4. The UE of claim 3, wherein CORESET transmissions belonging to different TRPs are associated with different waveform types, wherein Physical Downlink Control Channel ("PDCCH") transmissions from a same TRP are associated with a same waveform type.

5. The UE of claim 2, wherein the processor is configured to cause the UE to receive a Quasi-Co-Location ("QCL") type-D assumption for the multiple CORESETs, wherein CORESET identifiers having different QCL Type-D assumptions are associated with different waveform types, wherein Physical Downlink Control Channel ("PDCCH") transmissions with a same QCL Type-D assumption are associated with a same waveform type.

6. The UE of claim 2, wherein CORESET transmissions that overlap in a time domain are associated with a same waveform type.

7. The UE of claim 1, wherein, to receive the configuration for control channel signaling, the processor is configured to cause the UE to receive at least one search space configuration, each search space configuration for monitoring at least one Downlink Control Information ("DCI") format, wherein different DCI formats are associated with different waveform types.

8. The UE of claim 1, wherein, to receive the respective control channel signal transmission, the processor is configured to cause the UE to receive a scheduling Downlink Control Information ("DCI") using a specific waveform type, wherein the UE uses the specific waveform type to receive a downlink transmission scheduled by the scheduling DCI or to transmit an uplink transmission scheduled by the scheduling DCI or activated by the scheduling DCI.

9. The UE of claim 8, wherein the scheduling DCI contains an indication that the downlink transmission scheduled by the scheduling DCI or the uplink transmission scheduled or activated by the scheduling DCI is to use a same specific waveform type used to receive the scheduling DCI.

10. The UE of claim 1, wherein, to receive the respective control channel signal transmission, the processor is configured to cause the UE to receive a scheduling Downlink Control Information ("DCI") containing a waveform type indication, wherein the UE uses the indicated waveform type to receive a downlink transmission scheduled by the scheduling DCI or to transmit an uplink transmission scheduled by the scheduling DCI or activated by the scheduling DCI.

11. The UE of claim 10, wherein the scheduling DCI is received using a first waveform type and the waveform indication indicates a second waveform type, wherein the UE does not switch waveforms when a delay requirement is not satisfied between a reception time of the scheduling DCI and a scheduled time of the downlink transmission or the uplink transmission scheduled by the scheduling DCI.

12. The UE of claim 1, wherein, to receive the respective control channel signal transmission, the processor is configured to cause the UE to receive a scheduling Downlink Control Information ("DCI"), wherein the UE uses a first waveform type to receive a downlink transmission scheduled by the scheduling DCI or to transmit an uplink transmission scheduled by the scheduling DCI, the first waveform type being associated with a precoding granularity size of a precoding resource block group.

13. The UE of claim 1, wherein, to receive the respective control channel signal transmission, the processor is configured to cause the UE to receive a single scheduling Downlink Control Information ("DCI") that schedules multiple transmission occasions, wherein the processor is further configured to cause the UE to switch a waveform type used for different ones of the multiple transmission occasions.

14. The UE of claim 13, wherein the multiple transmission occasions are of a same physical channel, wherein the same physical channel comprises one of: a Physical Downlink Shared Channel ("PDSCH") or a Physical Uplink Shared Channel ("PUSCH").

15. The UE of claim 13, wherein the multiple transmission occasions are for different transmit-receive points ("TRPs"), wherein transmission occasions belonging to different TRPs are associated with different waveform types.

16. The UE of claim 13, wherein the processor is configured to cause the UE to receive a waveform switching pattern for retransmissions of a transport block ("TB") during the multiple transmission occasions.

17. The UE of claim 1, wherein the processor is configured to cause the UE to receive a configuration for multiple bandwidth parts ("BWPs"), wherein, to receive the respective control channel signal transmission, the processor is configured to cause the UE to receive an indication to switch from a current active bandwidth part to a new active bandwidth part, wherein the processor is configured to cause the UE to switch a waveform type when switching bandwidth parts, wherein each bandwidth part is associated with a waveform type.

18. The UE of claim 17, wherein a different waveform type is configured for different subcarrier spacing values, wherein, to switch bandwidth parts, the processor is configured to cause the UE to switch to a different subcarrier value.

19. A method performed by a User Equipment ("UE"), the method comprising:
  receiving a configuration for control channel signaling;
  determining a waveform type for a respective control channel signal transmission based on the configuration, wherein at least two different waveform types are associated with different transmissions in a same slot;
  receiving, from a radio access network ("RAN"), the respective control channel signal transmission using the determined waveform type; and
  determining, based on the determined waveform type and the received configuration, a corresponding waveform type for a shared channel transmission scheduled by the control channel signal transmission.

20. A base station for wireless communication comprising:
  a memory; and
  a processor coupled to the memory, the processor configured to cause the base station to:
    transmit, to a User Equipment ("UE") a set of configurations for control channel signaling, wherein at least two different waveform types are associated with different configurations for control channel signaling;
    transmit a respective control channel signal transmission using an associated waveform type,
    wherein the associated waveform type and a respective configuration for control channel signaling indicate a corresponding waveform type for a shared channel transmission scheduled by the control channel signal transmission.

* * * * *